US012680671B2

(12) United States Patent
Wang et al.

(10) Patent No.: US 12,680,671 B2
(45) Date of Patent: Jul. 14, 2026

(54) INDEXED MULTI-LEVEL SELECTOR FOR LIGHT BEAM WITH DIFFERENT BUT ADJACENT WAVELENGTHS

(71) Applicant: Excelitas Canada, Inc., Vaudreuil-Dorion (CA)

(72) Inventors: Yong Wang, Markham (CA); Meenu Kajal, Mississauga (CA); Babu Kanhiram, Mississauga (CA)

(73) Assignee: Excelitas Canada, Inc., Vaudreuil-Dorion (CA)

( * ) Notice: Subject to any disclaimer, the term of this patent is extended or adjusted under 35 U.S.C. 154(b) by 0 days.

(21) Appl. No.: 19/062,641

(22) Filed: Feb. 25, 2025

(65) Prior Publication Data

US 2025/0189104 A1 Jun. 12, 2025

Related U.S. Application Data

(63) Continuation of application No. PCT/US2022/075625, filed on Aug. 30, 2022.

(51) Int. Cl.

| | |
|---|---|
| ***F21V 14/04*** | (2006.01) |
| *F21Y 113/13* | (2016.01) |
| *F21Y 115/10* | (2016.01) |

(52) U.S. Cl.

CPC ........... *F21V 14/04* (2013.01); *F21Y 2113/13* (2016.08); *F21Y 2115/10* (2016.08)

(58) Field of Classification Search

CPC ............................ F21V 14/04; F21Y 2113/13

See application file for complete search history.

(56) References Cited

U.S. PATENT DOCUMENTS

2005/0002110 A1* 1/2005 Imade .................. G03B 21/208 359/640
2005/0046807 A1* 3/2005 Hanano ................ G03B 21/208 353/98

(Continued)

FOREIGN PATENT DOCUMENTS

CN 111505911 A 8/2020
EP 1494062 A2 1/2005

(Continued)

OTHER PUBLICATIONS

Invitation to Pay Additional Fees mailed Apr. 11, 2023 in connection with International Application No. PCT/US2022/075625.

(Continued)

*Primary Examiner* — Christopher E Dunay

(74) *Attorney, Agent, or Firm* — Wolf, Greenfield & Sacks, P.C.

(57) ABSTRACT

A multi-wavelength light source for switching a light beam with different wavelengths is provided, wherein the light source covers a range of wavelengths. The light source contains a series of light emitting diodes (LEDs) arranged in a circular or semicircular pattern, where each LED is associated with one channel and has a different wavelength falling within the range of wavelengths. A rotational center mirror and dichroic plate is provided and an engine that controls rotation of the rotational center mirror and dichroic plate and switching speed of the mirror and dichroic plate. Each of the LEDs is fixed on its indexed position having different planes of incidence however once the dichroic is moved by the motor to face the selected LEDs the source beams make same incident ray angle to the dichroic. The output light beam of every light source is reflected along the same output direction by the rotational dichroic, and wherein the rotational center mirror, as controlled by the (Continued)

engine, acts as a switch for light beams with different wavelengths that are received from the different LEDs.

19 Claims, 6 Drawing Sheets

(56) References Cited

U.S. PATENT DOCUMENTS

2011/0286212 A1* 11/2011 Furuta .................. A61B 1/0669 362/231
2015/0241003 A1* 8/2015 Ikami ........................ G01J 3/10 362/231
2015/0323462 A1* 11/2015 Ghosh .................... G02B 21/16 435/29
2020/0224854 A1* 7/2020 Jurik ......................... F21V 9/40
2022/0348354 A1* 11/2022 Hessling-von Heimendahl .......... B64D 47/04
2024/0134260 A1* 4/2024 Shams ............... G03B 21/2033

FOREIGN PATENT DOCUMENTS

EP 2388626 A2 11/2011
EP 2902844 A1 8/2015

OTHER PUBLICATIONS

International Search Report and Written Opinion mailed Jun. 2, 2023 in connection with International Application No. PCT/US2022/075625.
International Preliminary Report on Patentability mailed Mar. 13, 2025 in connection with International Application No. PCT/US2022/075625.

* cited by examiner

FIG. 3A
Intensity distribution without beam shaping elements
Intensity distribution with beam shaping elements
FIG. 3B

INDEXED MULTI-LEVEL SELECTOR FOR LIGHT BEAM WITH DIFFERENT BUT ADJACENT WAVELENGTHS

CROSS REFERENCE TO RELATED APPLICATIONS

This application claims priority under 35 U.S.C. § 120 to and is a continuation of International Application No. PCT/2022/075625, filed Aug. 30, 2022, and titled "INDEXED MULTI-LEVEL SELECTOR FOR LIGHT BEAM WITH DIFFERENT BUT ADJACENT WAVELENGTHS," the contents of which are incorporated by reference herein in their entirety.

FIELD OF THE INVENTION

The present invention relates to the detection of fluorescence of biological molecules, and specifically, to the homogenization of and switching between the excitation light beams originating from different light emitting diodes (LEDs).

BACKGROUND

Many biological molecules of interest naturally fluoresce when excited by shorter-wavelength ultra-violet (UV) light. Traditionally, a fluorescence spectrophotometer measures the fluorescent light emitted from a sample at different wavelengths, after illumination with lamps; xenon arcs and mercury-vapor lamps. The light from an excitation source passes through a filter or monochromator and strikes the sample. A proportion of the incident light is absorbed by the sample, and some of the molecules in the sample fluoresce. A mercury vapor lamp is a line lamp, meaning it emits light near peak wavelengths. By contrast, a xenon arc has a continuous emission spectrum with nearly constant intensity in the range from 300-800 nm and a sufficient irradiance for measurements down to just above 200 nm. No monochromator is perfect at achieving complete blocking of the out of band light and it will transmit some stray light, that is, light with other wavelengths than the targeted. An advanced fluorometer uses UV light emitting diode (LED) light to excite the microorganisms in the sample into generating fluorescent energy (an auto-fluorescent signal). All these configurations with UV LED light only include one or two UV LEDs.

The Excitation Emission Matrix (EEM) is a specific measurement that is becoming more and more respected and widely used within the field of fluorescence spectroscopy, by exciting the sample with multiple different wavelengths and collecting and detecting fluorescent emission further, the fluorescence emission may be directed into a spectrophotometer to produce an excitation matrix. For the EEM, the light source may have a wavelength of, or have a wavelength in the range of 200 nm to 800 nm, such as, for example, 230 nm, 260 nm, 265 nm, 270 nm, 275 nm, 280 nm and 285 nm, but also at 300 nm~420 nm in 5-10 nm wavelength separation.

In U.S. Pat. No. 8,651,695, a high intensity LED based lighting array has a ring assembly having a plurality of reflectors and LEDs. The ring assembly has a planar surface mounting each of the plurality of primary reflectors in perpendicular relation to a respective one of the plurality of light emitting diodes. A secondary diffuser is positioned on the ring to mix light from the LEDs to create a uniform light emission in a range of azimuth angles. Unfortunately, the coupling efficiency is very low due to reflector diffusion. In fact, the coupling efficiency may be less than 1 percent.

In U.S. Pat. No. 8,596,815, LED chips emit light within different wavelength ranges and are distributed laterally with respect to the axis over an area, where the LED chips have light emitting surfaces for emitting light in directions transverse to the area. An optical element adjacent to the light emitting surfaces of the LED chips in the at least one array collects and directs light emitted by the LED chips of the at least one array along the axis towards a target. Another embodiment is directed to a method for providing light having multiple wavelengths for fluorescent microscopy. The different wavelengths may have a different optical axis and the optical beam is not collimated because of the larger LED source.

United States patent publication number 20040189787 provides a rotating mirror to sequentially receive light from a plurality of solid state light emitters and to provide a time-multiplexed light output, but not for combining different wavelength with overlap spectrum. In addition, there is no rotation of the mirror.

In U.S. Pat. No. 6,760,506, an optical switch is provided for switching a light beam from at least one optical input to one of a plurality of outputs. In the optical switch all input beams have the same plane of incidence, and the mirror is only used for tuning light directions.

Finally, in U.S. Pat. No. 9,250,431, a high-power microscopy illumination system is disclosed, which includes a solid-state illumination source. A diffusing collection lens having a diffusing surface is configured to collect and diffuse light emission from the solid-state illumination source. An emitting surface is disposed substantially opposite the diffusing surface. An optical coupling element couples the light emission from the diffusing collection lens emitting surface along an optical axis to an optical output. The diffusing collection lens provides improved uniformity of illumination with direct coupling, without significant power loss. It is noted, however, that this system is for improving the output beam uniformity, not for improving the UV beam angular distribution consistency of different UV LED sources.

Advanced fluorometer systems for EEM analysis can improve the signal-to-noise ratio of the auto-fluorescence signal by using narrow bandwidth UV light emitting diode (LED) light instead of broadband lamp sources. Unfortunately, the combining of many LEDs within 5-10 nm wavelength separation using a traditional dichroic plate combiner, is not practical, and is very costly due to the requirements of sharp deep dichroic plate coating. This process is also very complicated, if not impossible. To date optical output of LEDs in UVB/UVC range are several times lower than UVA or color LEDs. In addition, optical coupling efficiency for combining multiple wavelength LED sources to application target would be low when using a traditional dichroic plate layout, because of reflective/absorptive losses encountered along the series of dichroic plates in the optical path. The dichroic filter losses at UVB/UVC wavelengths are considerably higher than the losses in the visible wavelength range due to substrate and coating material limitations. Therefore, there is a need to overcome these shortcomings of the prior art to improve the spectral quality of excitation signal while maintaining good optical coupling efficiency of the combined beam.

SUMMARY OF THE INVENTION

Embodiments of the present invention provide a multi-wavelength light source for switching a light beam with different wavelengths, wherein the light source covers a range of wavelengths. The light source contains a series of light emitting diodes (LEDs) arranged in a circular or semicircular pattern, where each LED is associated with one channel and has a different wavelength falling within the range of wavelengths. A rotational center mirror is provided and an engine that controls rotation of the rotational center mirror and switching speed of the mirror. Each LED has a different plane of incidence and a same incident ray angle, where a reflected output light beam of the light source is reflected in the same direction by the rotational center mirror, and wherein the rotational center mirror, as controlled by the engine, acts as a switch for light beams with different wavelengths that are received from the different LEDs. The series of LEDs arranged in a circular or semicircular pattern can be arranged on multiple levels where channels in layer one and layer two are offset to allow selection of one channel at a time, corresponding to its unique angular identification.

A dichroic beam combiner located in a beam path of a second channel associated with layer two can be provided serves as a dual function optical element, where the dichroic beam combiner has a cut-on/-off wavelength between the two sets of wavelength bands of layer one and layer two, so that the dichroic beam combiner allows light from the layer one channels to transmit through whereas the light from the layer two channels will be reflected so that both beams are combined in a final output. A single edge or multi-band dichroic beam splitter which specifically reflects wavelengths in the LEDs of the given layer but transmits other wavelengths can replace central rotating mirror to further aid in suppression of stray light in the output signal.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principals of the invention.

FIG. 3A is a graph illustrating an intensity distribution without the use of beam homogenizers.

FIG. 3B is a graph illustrating an intensity distribution with the use of beam homogenizers.

DETAILED DESCRIPTION

When multiple LEDs are used in an attempt to provide illumination that covers a range of spectrum of light, the LEDs traditionally provide light that is far apart in the spectrum, resulting in there being a number of discrete peaks within the spectrum covered by the multiple LEDs. However, in certain applications it is desirable to have a flat spectrum, such as a lamp spectrum, where there are little to no discrete peaks. An example of such an implementation is in the field of medical imaging where more and more markers are being used in the illumination of tissue and cells in general, resulting in the need for the emission of a greater spectrum of light without discrete peaks. Therefore, there is a need to have LEDs that can fill the gaps with other wavelengths so as to have a truer broadband illumination system where there are fewer peaks and valleys. The present system provides a continuum of wavelengths, as opposed to only specific wavelengths. The present system provides for multiple wavelengths of light to be provided and spaced very close together spectrally through the use of multiple LEDs in one or more array. For exemplary purposes, the present schematic description provides an example of using twelve LEDs with associated wavelengths that are spectrally adjacent is provided. It should be noted, however, that the present invention is not limited to twelve LEDs, but may instead be more or fewer LEDs.

Figure 1:
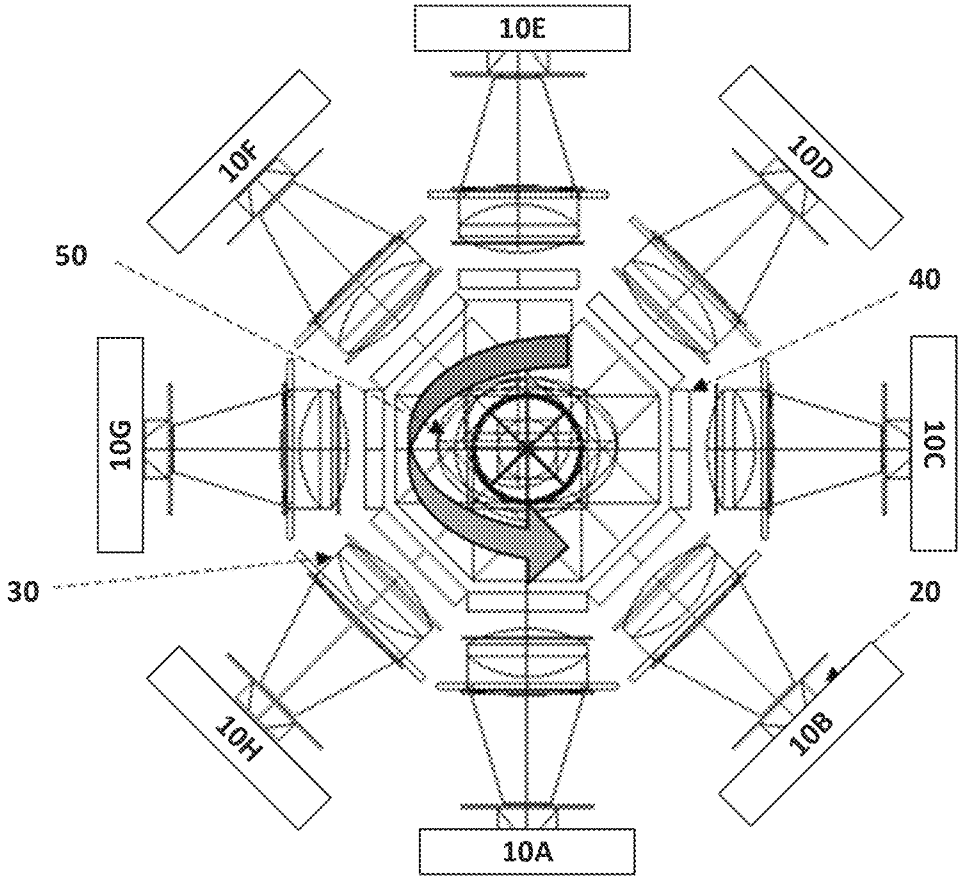
FIG. 1 is a schematic diagram providing a cross-sectional bottom view of the present system for switching a light beam with different wavelengths, in accordance with a first exemplary embodiment of the invention.

FIG. 1 is a schematic diagram providing a cross-sectional bottom view of the present system 2 for switching a light beam with different wavelengths, in accordance with a first exemplary embodiment of the invention. As will be explained in detail herein, the present system 2 acts as an excitation channel selector. The present system 2 is a multi-wavelength light source. As shown by FIG. 1, a series of LEDs 10A-10H are arranged in a circular pattern. While eight LEDs are illustrated, it should be noted that there may be more or fewer LEDs depending upon the range of wavelengths that are intended to be covered by the present system 2. Each LED 10 is associated with one channel and each LED 10 could have a different wavelength. The wavelength of an LED can be any specific wavelength. In the present exemplary embodiment illustrated by FIG. 1, there are eight specific wavelengths spaced closely within a certain bandwidth of each other.

Since the present system 2 contains multiple LEDs, where each LED has a specific wavelength and those wavelengths cover a range with all wavelengths within that range covered, the present system 2 provides a truer broadband system. This is even the case when the wavelengths are spaced very close together. This is ideal when there is a need to have a flat spectrum for the system, where multiple wavelengths need to be provided for by the system. An example of such use may be in the medical industry, where multiple fluorescence markers are provided and there is a need for a single system that can use multiple excitation wavelengths for detection.

In accordance with an alternative embodiment of the invention, the LEDs may instead be arranged in a semicircular arc so that there is not a full circular pattern of LEDs. In addition, while the present description provides the example of single LEDs arranged in a circular pattern, one having ordinary skill in the art would appreciate that there may instead be multiple LEDs that are in a single array 10A and each of the arrays of LEDs 10A-10H may be arranged in a circular or semi-circular arc pattern. In such a single array configuration, each of the LEDs within a single array may emit light within the same bandwidth. Alternatively, each of the LEDs within a single array (such as 10A) emits light having a different bandwidth. In such a further alternative embodiment, the multiple LEDs act as a single source with relatively wider bandwidth.

Figure 2:
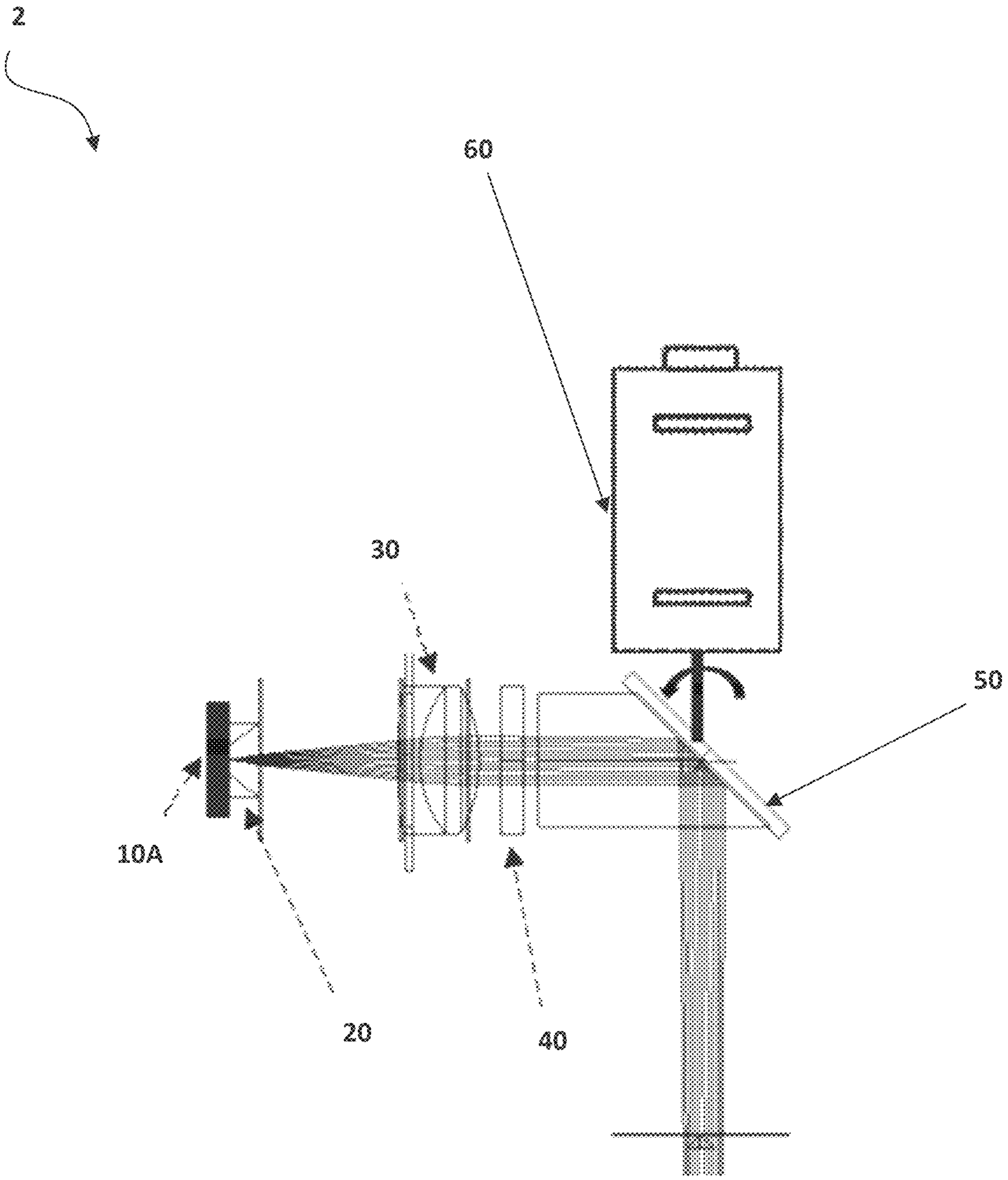
FIG. 2 is a schematic diagram providing a side cross-sectional view of the present system, but from the perspective of only a single LED providing a beam of light, thereby illustrating a single channel.

At the center of the circular LED arrangement is a rotational center mirror 50, which is controlled by a motor 60 (FIG. 2). The motor 60 (FIG. 2) can be a fast-switching motor that can be locally or remotely controlled. A motor encoder or electromechanical device (not shown) on the motor provides the added functionality of switching speed and position control. The rotational center mirror 50, which is controlled by the motor 60 (FIG. 2), acts as a switch for light beams with different wavelengths that are received from the different LEDs 10A-10H. At a given time, it is desirable for the light from one LED 10A, having a specific desired bandwidth, to shine upon an output block, and logic within the motor 60 is used to cause position of the rotational center mirror 50 to change so that the light from the LED associated with the desired bandwidth is directed by the rotational center mirror 50. The motor encoder has a pre-calibrated home position and different wavelength channels positions are optimized relative to an encoder position and saved as a lookup table in non-volatile memory (NVM). The system firmware signals the motor encoder to bring the motor along with mirror/dichroic to a position that corresponds to the optical path of a selected wavelength channel. The operation of the motor can be externally controlled via a computer program to allow setting of wavelength sequence and pulse-timing for the intended application of automatically generating the excitation emission matrix across all wavelengths for fluorescence analysis.

FIG. 2 is a schematic diagram providing a side cross-sectional view of the present system 2, but from the perspective of only a single LED 10A providing a beam of light, thereby illustrating a single channel. As shown by FIG. 2, the LED 10A provides a beam of light that is received by a beam homogenizer 20. The beam homogenizer 20 homogenizes the LED beam from the LED 10A. Homogenization is beneficial because the LED has an inconsistent angular distribution, so the beam homogenizer 20 improves the LED beam angular and spatial distribution at target. It is noted that each LED beam from each separate LED could have a different angular and spatial distribution, each of which can be improved by beam homogenizers. The beam homogenizer 20 could be a specially designed collecting lens with angle controlled scattering surfaces or a special shaped diffusing cavity. An example of the beam homogenizer 20 is the diffusing collecting lens emitting surface along an optical axis to an optical output. The diffusing collection lens provides improved beam angular distribution without significant power loss.

FIG. 3A is a graph illustrating an intensity distribution without the use of beam homogenizers. Alternatively, FIG. 3B is a graph illustrating an intensity distribution with the use of beam homogenizers. As shown by FIG. 3B, there is a consistent output intensity distribution achieved using a beam homogenizer for different LED channels.

It is preferred that an LED is turned on only when used by the system 2. Specifically, if light having a bandwidth of a first LED 10A is necessary, the system 2 provides power to the first LED 10A and directs the mirror 50 toward the first LED 10A. If light having a bandwidth of a fourth LED 10D is then required, the first LED 10A is turned off and the fourth LED 10D is turned on, with the mirror 50 then being turned to face the fourth LED 10D so that the associated light can be directed from the system 2. It should be noted that the timing of turning on an LED 10 and directing the mirror 50 may be such that the mirror 50 is directed first to face the LED 10 to be used, after which the LED to be used is turned on, or the LED may be turned on and then the mirror 50 turned. Either sequence will work in accordance with the present system 2 and associated method of use.

Referring to both FIG. 2 and FIG. 1, homogenized light is received by a collimating lens 30. A single lens or multiple lens elements 30 collimates the received light producing a parallel rays of light. A distance between the beam homogenizer 20 and the collimating lens 30 is dependent upon a size of beam required. For a larger beam, the collimating lens 30 is a further distance from the beam homogenizer 20, and for a smaller beam, the collimating lens 30 is closer to the beam homogenizer 20.

After collimation, the beam of light is received by the bandpass filter 40. The filter 40 may be a single bandpass filter or multiple bandpass filters stacked to achieve intended levels of rejection of the out-of-spectral-band light from the excitation source. Although each of the LEDs 10A-10H have their unique incident planes, a selected channel has the same incident angle with respect to the rotating mirror 50 when the mirror 50 is aligned to that channel, resulting in the reflected output light beam from the mirror 50 having the same direction and target.

Figure 4:
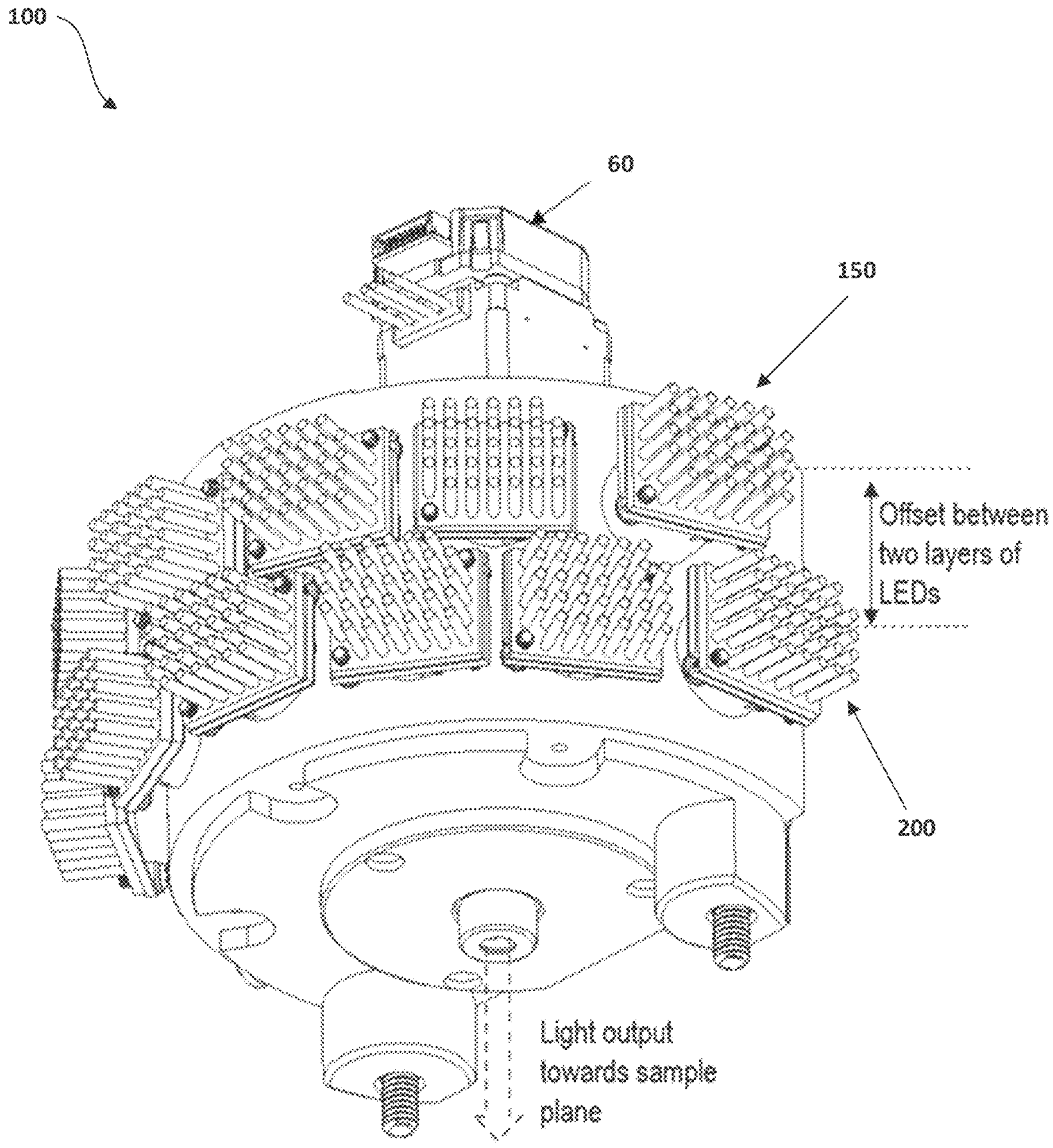
FIG. 4 is a schematic diagram illustrating a second embodiment of the present system in which LEDs are provided on multiple layers of the system.

FIG. 4 is a schematic diagram illustrating a second embodiment of the present system 100 in which LEDs are provided on multiple layers of the system. For exemplary purposes, the embodiment of FIG. 3 provides for two layers of LEDs. It should be noted that in accordance with an alternative embodiment of the invention, there may be more than two layers of LEDs provided.

The system 100 of FIG. 4 provides twelve (12) channels, where each channel is associated with separate LEDs. The twelve (12) channels are divided into two layers of six (6) channels each, namely, a first layer 150 and a second layer 200, where there is an offset between the two layers of LEDs. For the double layer embodiment, one can double the capacity of accommodated bandwidths of light in a small and accommodating package. Light from the LEDs are output toward a sample plane.

Figure 5:
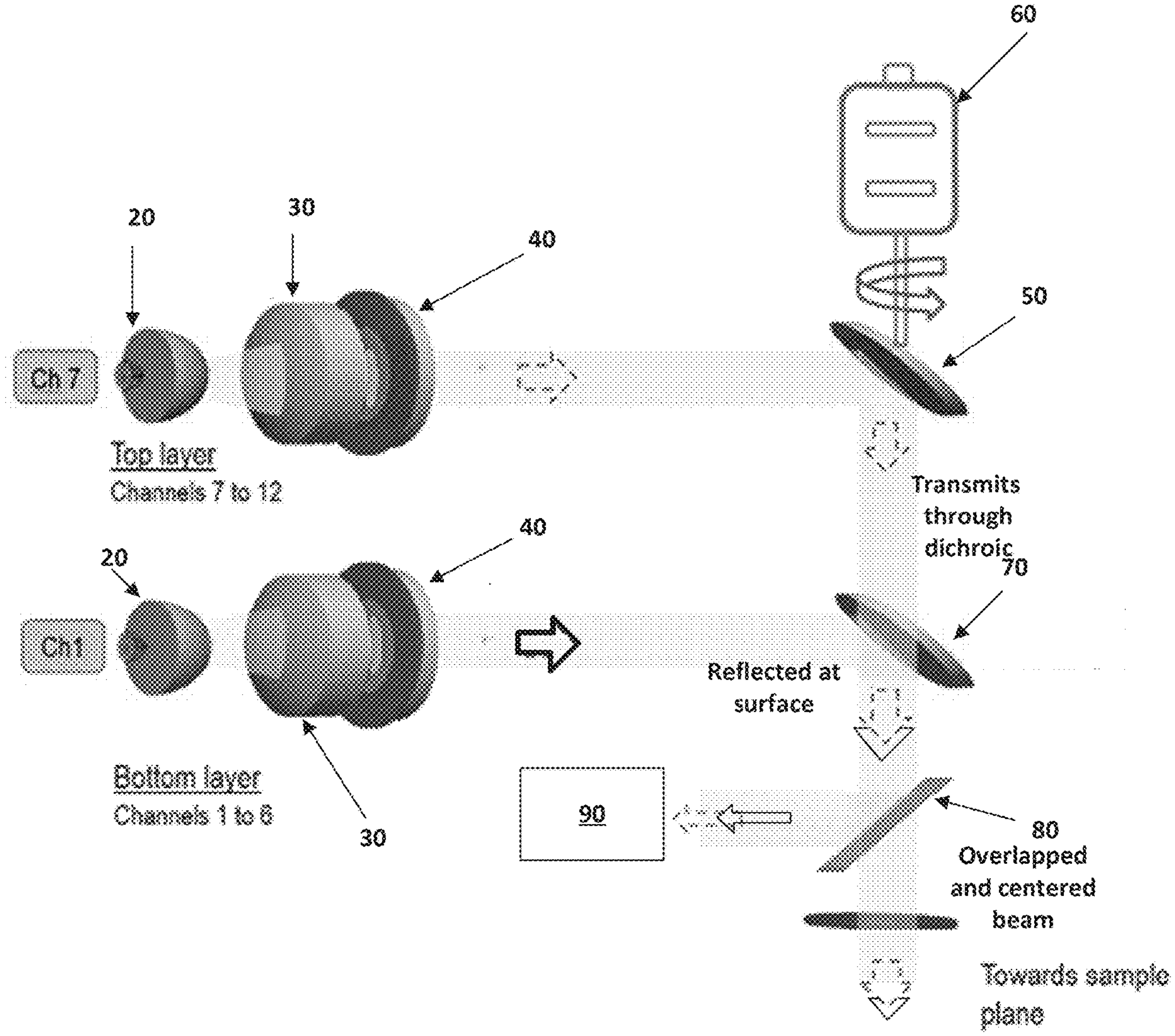
FIG. 5 is a schematic diagram that better illustrates a top layer LED and a bottom layer LED and how internal portions of the dual layer system work.

FIG. 5 is a schematic diagram that better illustrates a top layer LED and a bottom layer LED and how internal portions of the dual layer system 100 work. Referring to FIG. 5, a top layer 150 contains channels seven to twelve and a bottom layer contains channels one to six, resulting in twelve channels. The number of channels may be more or fewer than twelve. The two-layer architecture will decrease the overall path length from the LED to the sample and meet space constraint requirements.

Channel seven, as illustrated by FIG. 5, contains a beam homogenizer 20, a collimating lens 30, and one or more bandpass filter 40. Channel one also contains a beam homogenizer 20, a collimating lens 30, and a double filter 40. The motor 60 controls the motorized rotating mirror 50, as previously mentioned and described. When a wavelength associated with channel 1 is requested, LED 10A is turned on and the motor 60 directs the motorized rotating motor 50 to face LED 10A. The channels in layer one and layer seven are offset. This allows selection of one channel at a time, corresponding to its unique angular identification.

A dichroic beam combiner, or filter 70, is located in a beam path of channel 1. The dichroic filter 70 has a cut-on/-off wavelength between the two sets of wavelength bands of top and bottom layers. The dichroic allows light from the top layer channels to transmit through whereas the light from bottom channels will be reflected so that both beams are combined in the final output.

As illustrated by FIG. 5, the dual layer system 100 contains a single motorized rotating mirror 50, thereby providing a compact system design with an expanded number of wavelengths. The dual layer system 100 also contains an uncoated quartz plate 80 to direct a fraction of light towards a sensor element 90 that helps to monitor the output and provide a feedback signal. Such a sensor element 90 could be a CLF sensor, although the present system and method is not limited to having the sensor element be a CLF sensor. This is fed into a closed loop algorithm for stabilizing channel output over time. It should be noted that the quartz plate 80 can be any surface that scatters a small fraction of light towards the sensor element. In addition, the plate 80 could be installed to be at 45 degrees to an axis of the rotating mirror. In addition, the quartz plate 80 can have the same thickness and refractive index as the dichroic plate but with reverse 45 degree as in FIG. 5, to compensate for the light walk off from the dichroic plate.

The plate and sensor assembly is attached to the motor axis and rotates with the dichroic mirrors. The reverse orientation with respect to the dichroic allows it to compensate for the reflected beam walk off from bottom channels.

It should be noted that the rotational center mirror 50 can be used in switching Laser with different wavelengths. In such an embodiment, the LEDs may be Laser LEDs or the LEDs may be replaced by lasers having the characteristics of the LEDs as mentioned herein.

Figure 6:
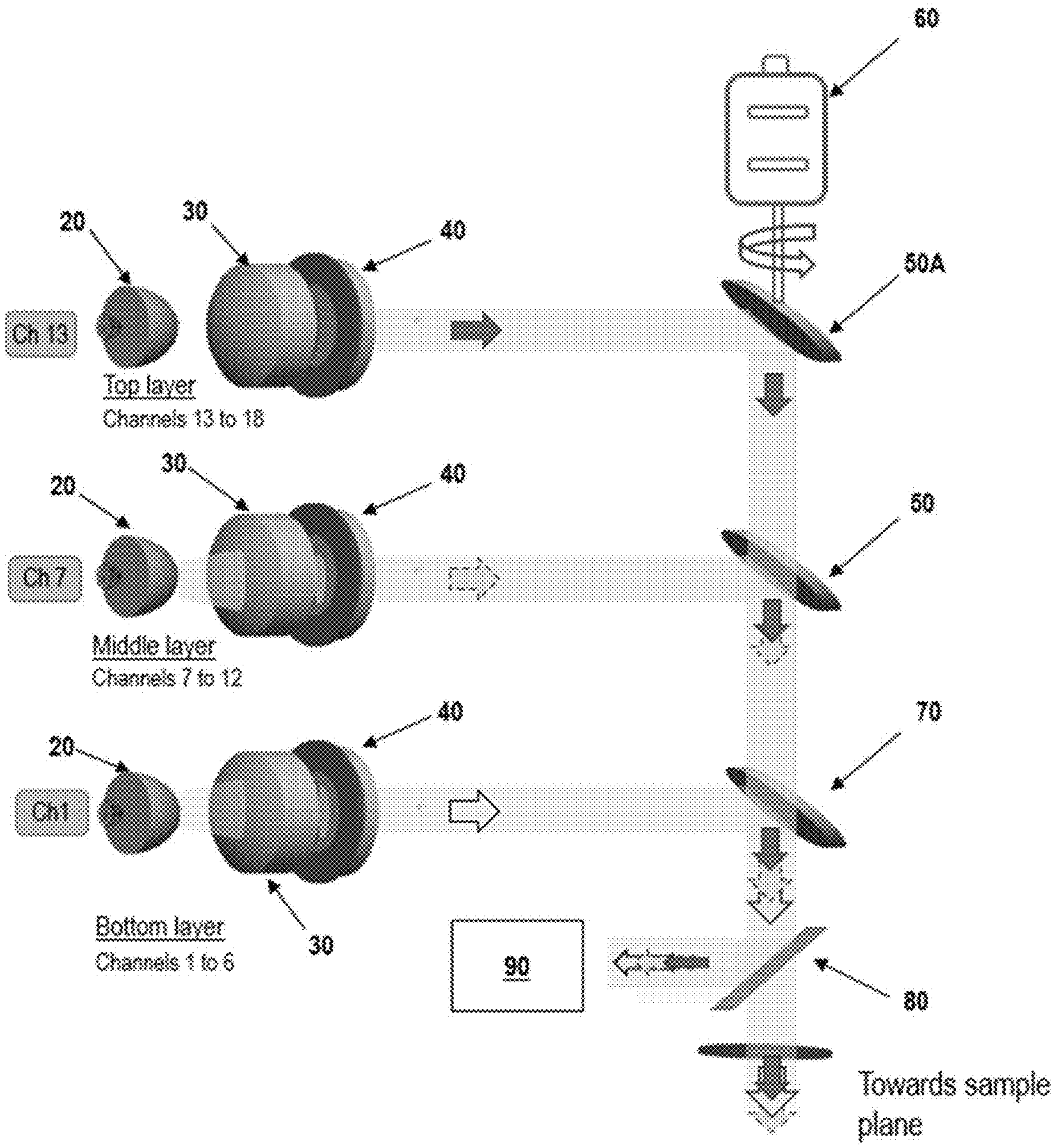
FIG. 6 is a schematic diagram that illustrates more than two layers for the system architecture.

It is noted that the present system and method is not limited to one or two levels of circular arrangement of LEDs. FIG. 6 is a schematic diagram illustrating more than two levels of circular arrangement of LEDs. One having ordinary skill in the art would appreciate that even more levels may be provided for in accordance with the present invention.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Other implementations are within the scope of the claims.

We claim:

1. A light source for detecting fluorescence of biological molecules, the light source comprising:
- a first plurality of channels arranged in an arc, channels of the first plurality of channels comprising:
  - a light emitting diode (LED) associated with a respective band of wavelengths;
- a second plurality of channels;
- a rotational center mirror coupled to a rotational apparatus; and
- a first dichroic plate coupled to the rotational apparatus, wherein:
  - the rotational apparatus is configured to:
    - control rotation of the rotational center mirror so that light from a first channel associated with a desired band of wavelengths is directed by the rotational center mirror in a beam path toward a biological sample undergoing fluorescence analysis; and
    - control rotation of the first dichroic plate so that light from a second channel of the second plurality of channels is directed by the first dichroic plate in the beam path toward the biological sample; and
  - the first dichroic plate is configured to:
    - transmit light having wavelengths associated with LEDs of the first plurality of channels; and
    - reflect light having wavelengths associated with LEDs of the second plurality of channels.

2. The light source of claim 1, wherein the LED for the first channel comprises an array of LEDS.

3. The light source of claim 2, wherein each LED within the array of LEDs emits light with a same peak wavelength.

4. The light source of claim 2, wherein each LED within the array of LEDs emits light with a different peak wavelength.

5. The light source of claim 1, further comprising a reflective plate disposed in the beam path and configured to direct a fraction of an output light toward a sensor element configured to monitor output of the light source.

6. The light source of claim 5, wherein the reflective plate is an uncoated quartz plate.

7. The light source of claim 5, wherein:
- the rotational center mirror is oriented such that an angle x is formed between a plane of the rotational center mirror and the beam path,
- the reflective plate is oriented such that an angle y is formed between a plane of the reflective plate and the beam path, and
- the angle y is equal in magnitude to the angle x.

8. The light source of claim 5, wherein the reflective plate and the sensor element are coupled to the rotational apparatus.

9. The light source of claim 1, wherein the LED comprises a laser LED.

10. The light source of claim 1, wherein a peak wavelength of the first channel is within 10 nanometers of a peak wavelength of a second channel.

11. The light source of claim 1, wherein channels of the first plurality of channels further comprise:
- a beam homogenizer configured to receive light from the LED.

12. The light source of claim 11, wherein channels of the first plurality of channels further comprise:
- a lens configured to collimate light received from the beam homogenizer.

13. The light source of claim 12, wherein channels of the first plurality of channels further comprise:
- a bandpass filter configured to filter light received from the lens.

14. The light source of claim 1, wherein:
- the first plurality of channels and the rotational center mirror are positioned in a first plane,
- the second plurality of channels and the first dichroic plate are positioned in a second plane, and
- the first plane is parallel to the second plane.

15. The light source of claim 14, wherein:
- the first dichroic plate is disposed in the beam path between the rotational center mirror and the biological sample.

16. The light source of claim 14, wherein:

channels of the first plurality of channels correspond to a first set of rotational angles of the rotational apparatus, channels of the second plurality of channels correspond to a second set of rotational angles of the rotational apparatus, and the first set of rotational angles is different from the second set of rotational angles.

17. The light source of claim 1, further comprising:

a third plurality of channels; and a second dichroic plate coupled to the rotational apparatus, wherein:

the rotational apparatus is configured to control rotation of the second dichroic plate so that light from a third channel of the third plurality of channels is directed by the second dichroic plate in the beam path toward the biological sample, and the second dichroic plate is configured to:

transmit light having wavelengths associated with LEDs of the first plurality of channels, transmit light having wavelengths associated with LEDs of the second plurality of channels, and reflect light having wavelengths associated with LEDs of the third plurality of channels.

18. The light source of claim 17, wherein a plane of a surface of the second dichroic plate is oriented in parallel to a plane of a surface of the first dichroic plate.

19. The light source of claim 1, further comprising control circuitry configured to automatically generate an excitation emission matrix of the biological sample by, for channels of the first plurality of channels:

causing the rotational apparatus to rotate the rotational center mirror to align with a channel;

causing the LED of the channel to emit light; and cause fluorescence emission from the biological sample to be received by a spectrophotometer.

* * * * *